(12) United States Patent  (10) Patent No.: US 8,385,029 B2
Wibben  (45) Date of Patent: Feb. 26, 2013

(54) OVER-CURRENT PROTECTION DEVICE FOR A SWITCHED-MODE POWER SUPPLY

(75) Inventor: Josh Wibben, Eden Prairie, MN (US)

(73) Assignee: Polar Semiconductor, Inc., Bloomington, MN (US)

( * ) Notice: Subject to any disclaimer, the term of this patent is extended or adjusted under 35 U.S.C. 154(b) by 786 days.

(21) Appl. No.: 12/557,307

(22) Filed: Sep. 10, 2009

(65) Prior Publication Data

US 2011/0058285 A1 Mar. 10, 2011

(51) Int. Cl.
H02H 9/00 (2006.01)

(52) U.S. Cl. .......................................................... 361/18

(58) Field of Classification Search .................... 361/18, 361/93.9
See application file for complete search history.

(56) References Cited

U.S. PATENT DOCUMENTS

| | | | |
|---|---|---|---|
| 3,859,586 A | 1/1975 | Wadlington | |
| 4,811,184 A | 3/1989 | Koninsky et al. | |
| 4,819,122 A | 4/1989 | Gontowski, Jr. | |
| 4,928,200 A | 5/1990 | Redl et al. | |
| 5,181,155 A | 1/1993 | Beg et al. | |
| 5,485,341 A | 1/1996 | Okado et al. | |
| 5,835,361 A | 11/1998 | Fitzgerald | |
| 6,903,912 B2 | 6/2005 | Kranister et al. | |
| 7,035,071 B1 | 4/2006 | Tiew et al. | |
| 7,116,563 B2 | 10/2006 | Hua | |
| 7,161,783 B2 | 1/2007 | Yoshida | |
| 7,817,391 B2* | 10/2010 | Kimber | 361/87 |
| 2005/0237688 A1 | 10/2005 | Wong et al. | |
| 2006/0221528 A1 | 10/2006 | Li et al. | |
| 2008/0266738 A1 | 10/2008 | Kimber | |
| 2011/0058285 A1* | 3/2011 | Wibben | 361/18 |

* cited by examiner

Primary Examiner — Ronald W Leja
(74) Attorney, Agent, or Firm — Kinney & Lange, P.A.

(57) ABSTRACT

An over-current protection device is employed to control switching associated with a switched mode power supply to prevent the excessive buildup of current. The device includes a function for relating the switching of the SMPS with a monitored output of the SMPS. This function is selectively modified to ensure the current associated with the SMPS does not exceed a maximum value and does not fall below a minimum value.

26 Claims, 8 Drawing Sheets

US 8,385,029 B2

OVER-CURRENT PROTECTION DEVICE FOR A SWITCHED-MODE POWER SUPPLY

BACKGROUND

The present invention relates to over-current protection devices, and more specifically to over-current protection devices for preventing over-current faults caused by excessive load currents and short-circuit faults.

Switched-mode power supplies (SMPS) are employed in a variety of applications to convert incoming supply (typically direct current) to a particular output voltage (typically direct current) for consumption by a load. A number of well-known configurations may be employed to implement a SMPS, such as buck, boost, buck-boost, flyback, etc. In each of these configurations, a switch employed by the SMPS is selectively controlled (i.e., turned 'on' and 'off') to dictate the output generated.

Changes in the load and/or fault conditions can result in the SMPS generating excessive output currents (i.e., over-current condition). To prevent excessive currents from damaging components, prior art SMPSs have included over-current protection circuits that limit the 'on' time of the switch in response to the monitored current exceeding a threshold value. However, for short-circuit faults, the current built-up during the minimum 'on' time of the switch may exceed the current discharged during the 'off' time. As a result, the current supplied by the SMPS continues to increase with each successive cycle.

SUMMARY

A switched-mode power supply (SMPS) includes at least one passive element for storing energy in the SMPS, and at least one switch that is selectively controlled (i.e., turned 'on' and 'off') to cause energy to be selectively stored to the passive element and discharged from the passive element. The SMPS further includes an over-current protection device that monitors current associated with the SMPS. The over-current protection device selectively modifies the switching of the at least one switch based on at least one of the monitored current and a voltage associated with the SMPS according to a defined function. The function is modified to maintain the monitored current between a maximum threshold value and a minimum threshold value.

DETAILED DESCRIPTION

The present invention provides an over-current protection device for use with switched-mode power supplies (SMPS). The over-current protection device monitors both the peak current (i.e., current magnitude following an "on" cycle) and the start current (i.e., current magnitude following an "off" cycle) of the SMPS. In response to an over-current condition the protection device turns 'off' the at least one switch. The duration of the 'off' time is selected based on the monitored peak current and the monitored starting current. In this way, the over-current protection device prevents current ratcheting of the switched mode power supply while ensuring the extended 'off' times do not disrupt the magnitude of the average output current.

Figure 1:
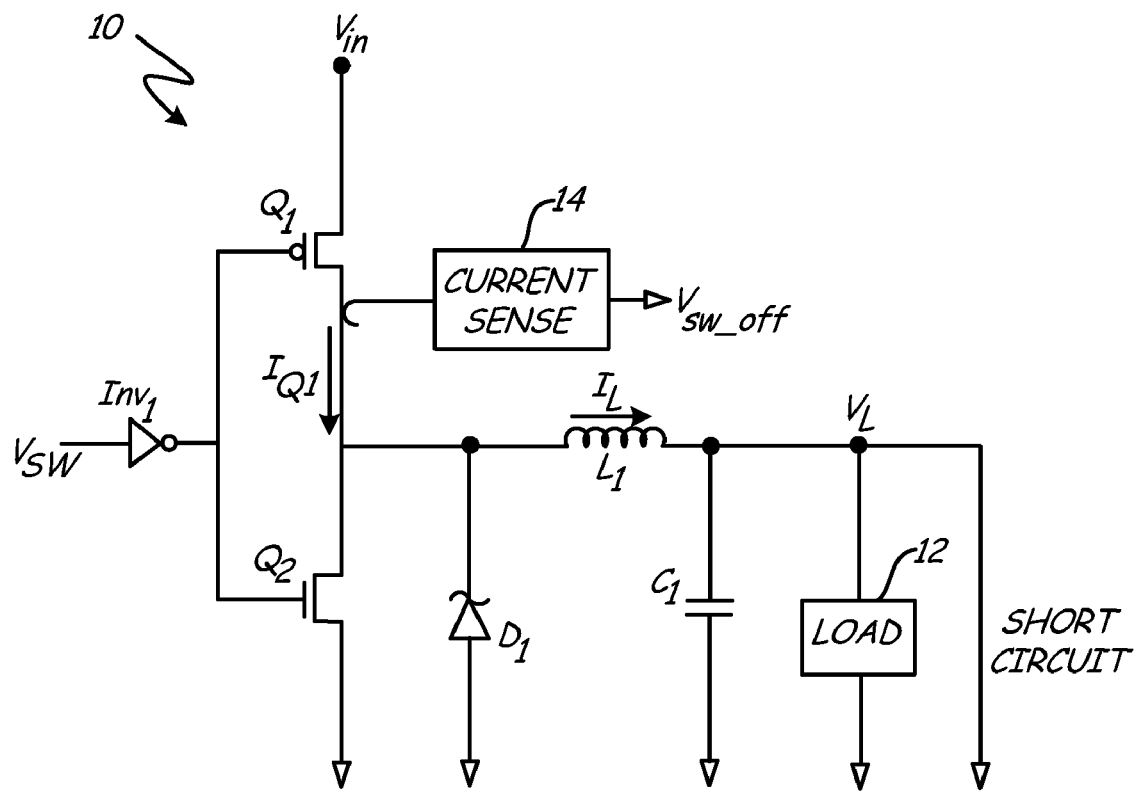
FIG. 1 is a circuit diagram of an over-current protection device as known in the prior art connected to a buck converter having a short-circuit fault across its load.
Figure 2A:
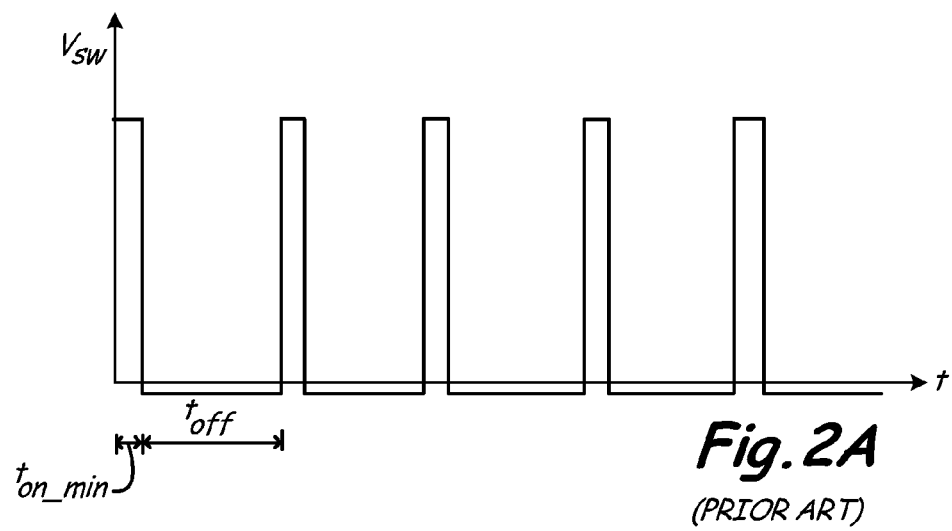
FIGS. 2A-2B are timing diagrams illustrating the inability of the prior art over-current protection device to prevent current ratcheting caused by a short-circuit fault.
Figure 2B:
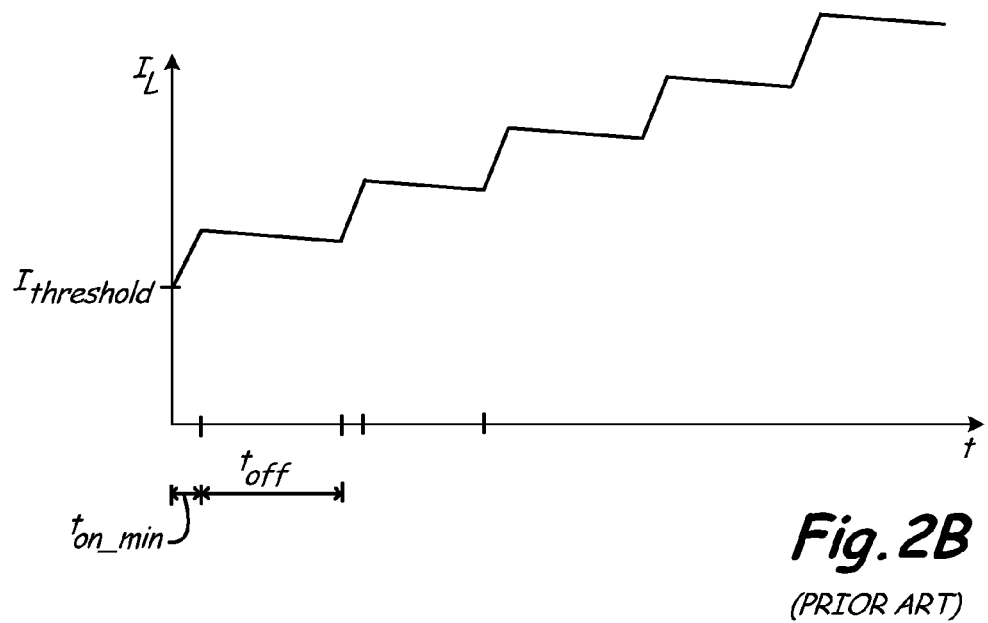

FIGS. 1 and 2A-2B illustrate a prior art method of over-current protection known as 'cycle-by-cycle' current limiting, and the inability of this protection scheme to prevent the generation of excessive currents caused by a short-circuit fault condition.

In particular, FIG. 1 illustrates buck converter device 10 connected to provide power to load 12. Buck converter device 10 is a type of switched-mode power supply (SMPS) that includes inverter $Inv_1$, a pair of transistors $Q_1$ and $Q_2$, diode $D_1$, inductor $L_1$, capacitor $C_1$, and over-current protection device 14. Buck converter device 10 regulates the voltage or current provided to load 12 by selectively turning transistors $Q_1$ and $Q_2$ 'on' and 'off' with a fixed frequency and a duty cycle determined by timing signal $V_{SW}$. When high-side transistor $Q_1$ is turned 'on', then input voltage $V_{in}$ provides charging energy to inductor $L_1$, which in turn provides regulated voltage or current to load 12. When high-side transistor $Q_1$ is turned 'off', then input voltage $V_{in}$ is prevented from providing energy to inductor $L_1$, allowing inductor $L_1$ to discharge through load 12.

Over-current protection device 14 is connected to monitor the current $I_{Q1}$ through high-side transistor $Q_1$, which corresponds to the inductor current $I_L$ through inductor $L_1$. If the current $I_{Q1}$ increases above a defined threshold, then over-current protection device 14 generates a signal (labeled $V_{sw\_off}$) that turns 'off' high-side transistor $Q_1$, thereby preventing input voltage $V_{in}$ from providing further charging energy to inductor $L_1$ until the next cycle. In this way, over-current protection device 14 minimizes the 'on' time of high-side transistor $Q_1$ if the measured current is greater than the defined threshold. However, cycle-by-cycle current-limiting protection does not alter the 'off' time associated with buck converter 10 because the SMPS operates at a fixed frequency. Therefore, high-side transistor $Q_1$ is turned 'on' at the start of the next cycle and current protection device 14 will again determine whether the inductor current $I_L$ exceeds the defined threshold. FIGS. 2A and 2B illustrate the effect of cycle-by-cycle current-limiting protection during a fault condition (e.g., short-circuit) such as the one shown in FIG. 1.

FIG. 2A illustrates the timing signal $V_{SW}$ applied to high-side transistor $Q_1$ that determines whether high-side transistor $Q_1$ is turned 'on' or 'off'. FIG. 2B illustrates the resulting magnitude of the inductor current as a result of the cycle-by-cycle current-limiting protection provided by the prior art during a short-circuit fault condition. As discussed above, the cycle-by-cycle current-limiting method of over-current protection compares the measured high side switch current $I_{Q1}$ to a threshold value to determine if an over-current condition exists. If an over-current condition is detected, then high-side transistor $Q_1$ is turned 'off' in order to prevent input voltage $V_{in}$ from further increasing inductor current $I_L$. The cycle-by-cycle current-limiting method of over-current protection does not alter the frequency of the timing signal $V_{SW}$, but rather seeks to minimize the 'on' time of timing signal $V_{SW}$. Due to propagation delays, the amount of time that timing signal $V_{SW}$ remains 'on' following detection of an over-current condition is constrained to a minimum value $t_{on\_min}$. Because the frequency is fixed, the duration of the 'off' time is also limited. In cases in which the output voltage is relatively low, the duration of the 'off' time may be insufficient in fully discharging the energy stored during the minimum 'on' time. As a result, current begins to ratchet up with each successive cycle.

This problem is illustrated with respect to FIG. 2B, which shows the resulting increase in inductor current $I_L$ despite the cycle-by-cycle current-limiting protection scheme of limiting the 'on' time associated with high-side transistor $Q_1$. Inductor current $I_L$ increases rapidly during the minimum 'on' time $t_{on\_min}$ of high-side transistor $Q_1$. Likewise, inductor current $I_L$ discharges or decreases relatively slowly during the 'off' time $t_{off}$ of high-side transistor $Q_1$. Despite efforts by over-current protection device 12 to reduce the 'on' time of high-side transistor $Q_1$, the minimum amount of time $t_{on\_min}$ that timing signal $V_{SW}$ remains 'on' during each cycle allows inductor current $I_L$ to increase rapidly. Likewise, the inability of cycle-by-cycle current-limiting protection to modify the 'off' time $t_{off}$ between successive cycles results in the inductor current $I_L$ only reducing by a small amount before the next cycle begins. In this way, the inductor current begins "ratcheting" up with each successive cycle.

Figure 3:
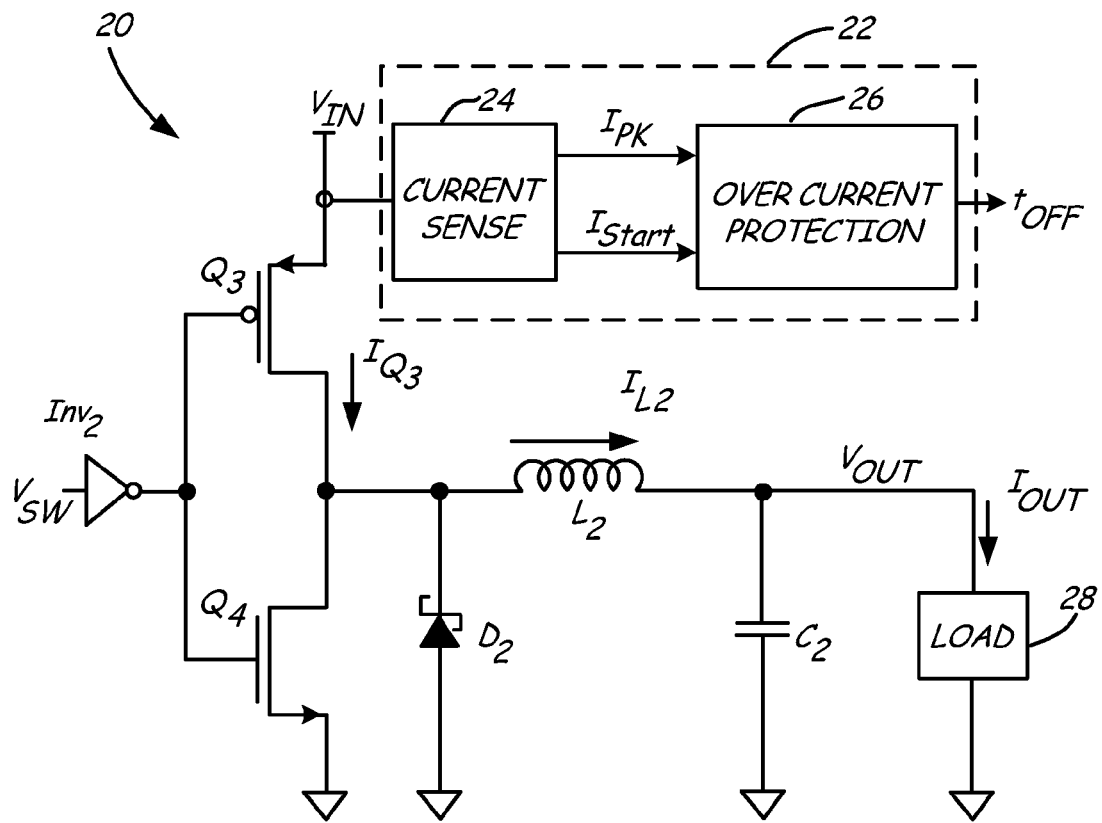
FIG. 3 is a circuit/block diagram of an over-current protection device connected to a buck converter according to an embodiment of the present invention.

FIG. 3 is a circuit/block diagram of switched mode power supply 20 according to an embodiment of the present invention. In the embodiment shown in FIG. 3, SMPS 20 is a buck converter that includes protection device 22, which in turn includes current sense device 24 and over-current protection device 26. A buck converter is one example of a switched-mode power supply which is suitable for use with protection device 22. In other embodiments, protection device 22 may be used in conjunction with other configurations of switched-mode power supplies or converters. For example, in other SMPS topologies the inductor employed by the buck converter may be replaced with a transformer.

SMPS 20 includes inverter $Inv_2$, first and second transistors $Q_3$ and $Q_4$, diode $D_2$, inductor $L_2$, capacitor $C_2$, and load 28. SMPS 20 operates in the same manner as the buck converter described with respect to FIG. 1. Switching signal $V_{SW}$ is provided at the input of inverter $Inv_2$ to selectively turn transistors $Q_3$ and $Q_4$ 'on' and 'off', thereby regulating the voltage or current provided to load 24. When high-side transistor $Q_3$ is turned 'on', input voltage $V_{in}$ provides charging energy to inductor $L_2$, which in turn provides regulated voltage or current to load 28. When high-side transistor $Q_3$ is turned 'off', then input voltage $V_{in}$ is prevented from providing energy to inductor $L_2$, allowing inductor $L_2$ to discharge through load 28.

Current sense circuit 24 is connected to monitor the current $I_{Q3}$ through transistor $Q_3$. As discussed above with respect to FIG. 1, when high-side transistor $Q_3$ is turned 'on', the current $I_{Q3}$ corresponds to the current $I_{L2}$ through inductor $L_2$. Although in this embodiment current is measured in transistor $Q_3$, in other embodiments, protection device 22 may monitor the inductor current at other suitable locations (such as directly at inductor $L_2$). Based on the monitored transistor current $I_{Q3}$ (or inductor current $I_{L2}$), current sense circuit 24 measures or otherwise estimates the peak current $I_{PK}$, which represents the maximum inductor current reached in a given cycle, and the start current $I_{start}$, which represents the inductor current $I_{L2}$ at the beginning of an 'on' cycle (i.e., when high-side transistor $Q_3$ initially turns 'on').

In situations in which the 'off' time has been extended, due to the monitored peak current exceeding a threshold value, the starting current $I_{start}$ monitored at the beginning of the next cycle is used to assess the duration of the 'off' time. If the starting current $I_{start}$ is too low (e.g., less than a threshold value), that suggests that the peak-to-peak inductor current $I_{L\_PkPk}$ is high, which will result in a undesirably low average current, such that the duration of the 'off' time should be decreased. In one embodiment, the peak-to-peak inductor current calculated based on a comparison of the monitored peak current and the monitored starting current is used to determine whether to decrease the duration of the 'off' time. In another embodiment, described with respect to FIG. 4, a minimum threshold value is introduced. If the monitored starting current $I_{start}$ falls below this minimum threshold, then the duration of the 'off' time is decreased.

The monitored current values, $I_{PK}$ and $I_{start}$ are provided by current sense circuit 24 to over-current protection device 26. In response to an over-current condition, over-current protection device 26 generates an 'off' signal $t_{off}$ that is provided to prevent timing signal $V_{SW}$ from turning 'on' high-side transistor $Q_3$, thereby extending the 'off' time of transistor $Q_3$.

In one embodiment in which the duration of the 'off' time is linearly related to the magnitude of the monitored peak current $I_{PK}$, the duration of the signal $t_{off}$ during an overcurrent condition ($I_{Q3}$ is greater than the threshold value $I_{block}$) is dictated by the following equation:

$$t_{off} \propto k_{block} * (I_{PK} - I_{block}) \qquad \text{Equation 1}$$

The duration of $t_{off}$ will always remain positive, for the case that the peak current $I_{PK}$ is less than the blocking current threshold $I_{block}$ the duration of $t_{off}$ will be dictated by the circuit that regulates the output rather than the over-current protection circuit. In this example, the term '$k_{block}$' represents a multiplier value that is selected in response to the magnitude of the start current to selectively increase or decrease the duration of subsequently extended 'off' times. In one embodiment, the multiplier value $k_{block}$ is stored in memory that allows the value to be updated once per cycle.

The term '$I_{block}$' is a threshold value that determines whether an over-current condition exists that requires extension of the 'off' time. So long as the peak current value $I_{PK}$ remains less than blocking current threshold $I_{block}$, no extended 'off' time is required. If the peak current value $I_{PK}$ exceeds the value of $I_{block}$, then the 'off' time is extended. Based on the embodiment employing Equation 1, as the difference between the peak current value $I_{PK}$ and the blocking current threshold $I_{block}$ increases, the duration of the 'off' time $t_{off}$ increases as well. This relationship between the duration of the 'off' time $t_{off}$ and the magnitude of the peak current value $I_{PK}$ prevents ratcheting of the current. In addition, this relationship can be adaptively modified by varying the multiplier value $k_{block}$ to prevent an extended 'off' time duration from decreasing the average current provided to load 28. In this way, the duration of the 'off' time, defined by $t_{off}$, is adaptively controlled based on both the peak current value $I_{PK}$ and the start current value $I_{start}$ to prevent both current ratcheting and decreases in the average current (i.e., current instability).

In one embodiment, described below with respect to FIG. 4, the value of the multiplier $k_{block}$ is selected by comparing the monitored starting current $I_{start}$ with a minimum threshold value $I_{min}$ to determine whether to decrease the $k_{block}$ value (as well as comparing the monitored peak current value $I_{PK}$ to a maximum threshold value $I_{max}$ to determine whether to increase the $k_{block}$ value). In other embodiments, the peak-to-peak current (difference between the monitored peak current $I_{PK}$ and the monitored starting current $I_{start}$) may be employed directly to determine the appropriate value of $k_{block}$.

In other embodiments, the relationship between the peak current value $I_{PK}$, the blocking current threshold $I_{block}$, and the multiplier $k_{block}$ as identified by equation 1 may be modified based on the application. For example, the relationship between the peak current value $I_{PK}$ and the blocking current threshold $I_{block}$ may be related either linearly or non-linearly.

Figure 4:
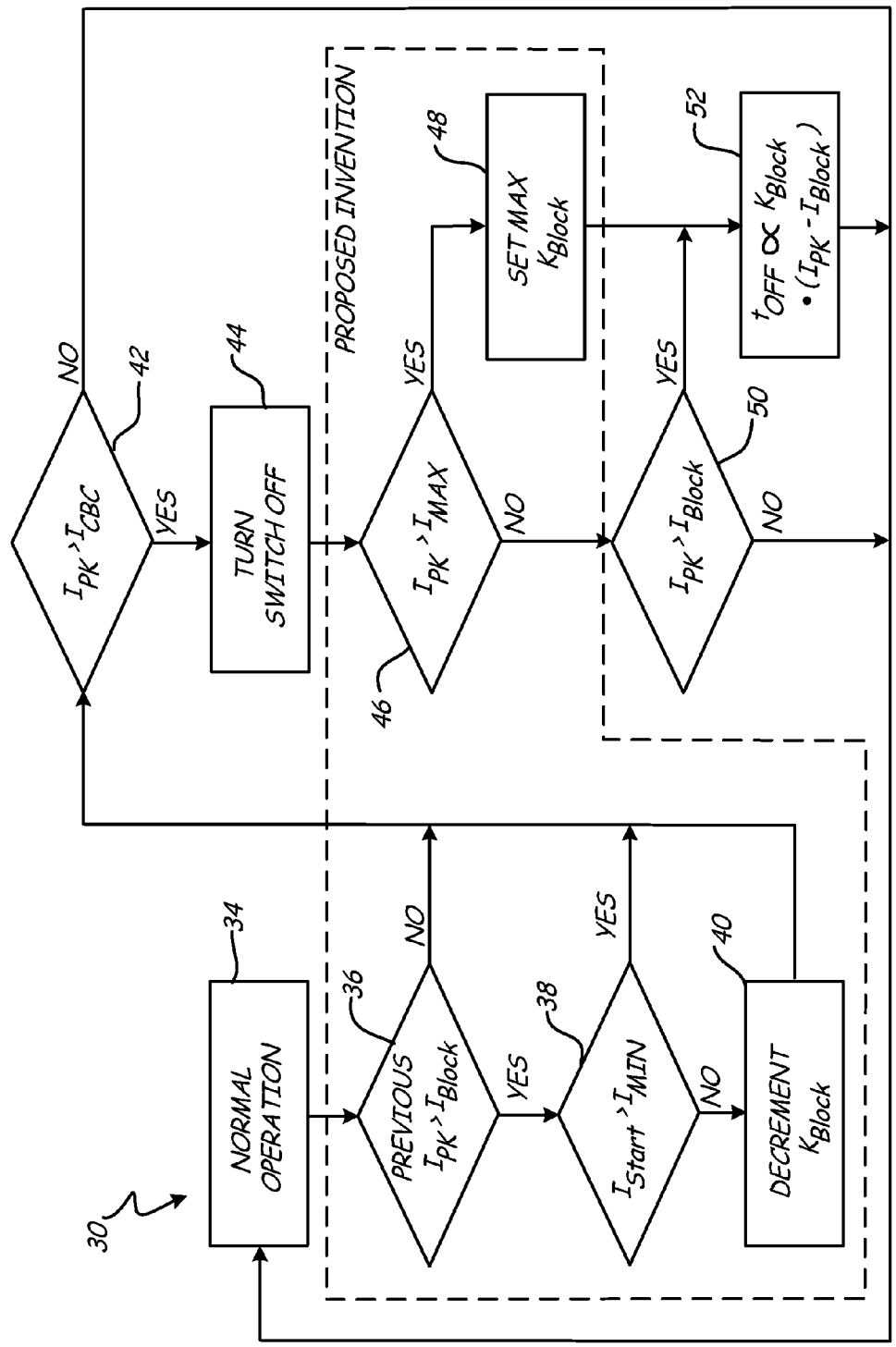
FIG. 4 is a flowchart illustrating functions performed by the over-current protection device according to an embodiment of the present invention.

FIG. 4 is a flowchart 30 illustrating the functions performed by over-current protection device 26 in adaptively generating off-time signal $t_{off}$. These functions may be implemented in hardware (e.g., analog circuitry) or a combination of hardware (e.g., digital signal processor, application-specific integrated circuit) operating with software for performing the defined functions. In the embodiment described with respect to FIG. 4, the multiplier $k_{block}$ is set equal to a maximum value at startup to ensure that an initial overcurrent condition results in an 'off' time that is of sufficient duration to prevent current buildup in a subsequent cycle from damaging the SMPS. The magnitude of the multiplier $k_{block}$ is decreased as required from this maximum value, unless the monitored peak current $I_{PK}$ exceeds a maximum allowable current threshold $I_{max}$ that requires the multiplier $k_{block}$ to be restored to a maximum value to prevent damage to the SMPS. The goal is to find an equilibrium point in which the peak current $I_{PK}$ does not exceed the maximum threshold $I_{max}$ but the starting current $I_{start}$ does not drop below a minimum threshold $I_{min}$.

The process begins at step 34 which is labeled 'Normal Operation', during which time the 'on' time and 'off' time of high-side transistor $Q_3$ are determined by the switching signal $V_{SW}$ provided at the input of inverter $Inv_2$ (as shown in FIG. 3). Steps 36, 38, and 40 determine whether an extended 'off' time provided in a previous cycle was too long, such that the magnitude of the multiplier $k_{block}$ should be decreased. That is, the magnitude of the multiplier $k_{block}$ is only decreased if an extended 'off' time was the reason for the monitored start current $I_{start}$ falling below a threshold value $I_{min}$. At step 36, over-current protection device 26 retrieves the result of the comparison between the peak current value $I_{PK}$ and the blocking current threshold $I_{block}$ from the previous cycle. If the peak current value $I_{PK}$ was not greater than the blocking current threshold $I_{block}$ during the previous cycle, indicating no extension of the 'off' time in the previous cycle, then flow proceeds to step 42. If the peak current value $I_{PK}$ was greater than the blocking current threshold $I_{block}$ during the previous cycle, then at step 38 the monitored start current value $I_{start}$ is compared to the minimum current threshold $I_{min}$ to determine whether the extended 'off' time provided in response to the previous peak current value exceeding the blocking current threshold $I_{block}$ was too long in duration. If the starting current value $I_{start}$ is not greater than the minimum current threshold $I_{min}$ (i.e., the starting current value $I_{start}$ is less than the minimum current threshold $I_{min}$), then at step 40 the multiplier $k_{block}$ is decremented to decrease the duration of subsequent off-time signals. Having decremented the multiplier $k_{block}$ at step 40, flow proceeds to step 42. Similarly, if at step 38 the starting current value $I_{start}$ is greater than the minimum current threshold $I_{min}$, then flow proceeds to step 42 without decrementing of the multiplier value $k_{block}$.

At step 42, the monitored peak current value $I_{PK}$ is compared with the cycle-by-cycle threshold $I_{CBC}$. The cycle-by-cycle current threshold '$I_{CBC}$' is a threshold value that defines when the high-side switch $Q_3$ should be turned 'off'. If the monitored peak current value $I_{PK}$ is less than the cycle-by-cycle threshold $I_{CBC}$ then normal operation of the high-side transistor $Q_3$ continues at step 34. If the monitored peak current value $I_{PK}$ is greater than the cycle-by-cycle threshold $I_{CBC}$ then the high-side switch $Q_3$ is turned 'off' at step 44.

At step 46, the monitored peak current $I_{PK}$ is compared with a maximum current threshold $I_{MAX}$, which is greater than the blocking current threshold and represents a current level so high that the duration of the 'off' time must be increased. Thus, if the monitored peak current $I_{PK}$ is greater than the maximum current threshold $I_{MAX}$, then the duration of the extended 'off' time is increased at step 48 by increasing the value of $k_{block}$. In this example, if the monitored peak current $I_{PK}$ is greater than the maximum current threshold $I_{max}$, then the multiplier value $k_{block}$ is set equal to a maximum value. Having increased the $k_{block}$ value (or set the $k_{block}$ value equal to a maximum value), at step 52 the duration of 'off' signal $t_{off}$ is determined based on the selected value of $k_{block}$, and the monitored peak current value $I_{PK}$.

If the monitored peak current is not greater than the maximum current threshold $I_{max}$, then at step 50 the monitored peak current is compared to the blocking current threshold $I_{block}$ to determine whether the 'off' time should be extended. If the monitored peak current $I_{PK}$ is greater than the blocking current threshold $I_{block}$, then at step 52 the 'off' time is extended based on the value of the multiplier value $k_{block}$ and the value of the monitored peak current $I_{PK}$. If the monitored peak current is less than the blocking current threshold $I_{block}$, then the 'off' time is not extended and normal operation continues at step 34.

Figure 5A:
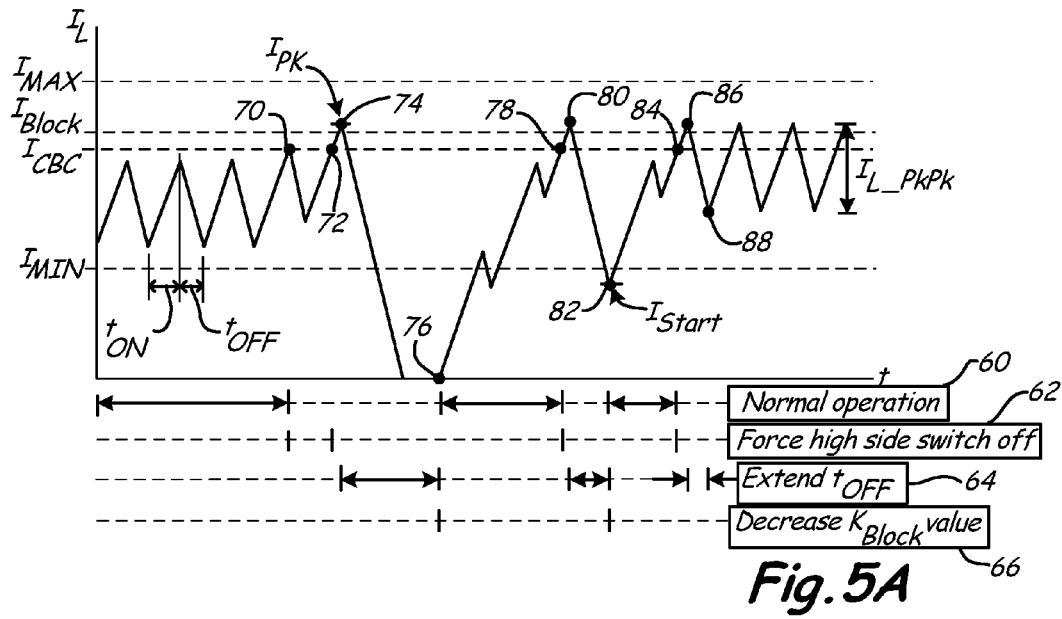
FIGS. 5A-5B are timing diagrams illustrating the ability of the over-current protection device to maintain the current within a desired range.

FIG. 5A is timing diagram that illustrates the functions performed by over-current protection device 26 as described with respect to the embodiment shown in FIG. 4. Threshold values illustrated in FIG. 5 include the maximum current threshold $I_{max}$, the blocking current threshold $I_{block}$, the cycle-by-cycle threshold $I_{CBC}$, and the minimum current threshold $I_{MIN}$. Along the bottom of the graph are timelines indicating the state of various signals during the operation of buck converter 20 according to an embodiment of the present invention. Top line 60 is labeled 'Normal Operation' and indicates with an unbroken line those time periods in which no extension of the 'off' time is required and the operation of transistors $Q_3$ is determined by switching signal $V_{SW}$. Line 62 is labeled 'Force high-side switch off' and indicates with hash marks those instances in which the monitored current $I_L$ exceeds the cycle-by-cycle threshold $I_{CBC}$ such that the high-side switch $Q_3$ should be turned 'off'. Line 64 is labeled 'Extend $t_{off}$' and indicates with unbroken lines those time periods in which the 'off' time of high-side switch $Q_3$ is extended in response to the peak current $I_{PK}$ exceeding the blocking threshold $I_{block}$. Line 66 is labeled 'Decrease $k_{block}$ value' and indicates with hash marks those instances in which extended 'off' times decrease the value of the monitored start current $I_{start}$ below the minimum threshold $I_{MIN}$, such that the duration of the 'off' time should be decreased (in this example, the magnitude of the multiplier value $k_{block}$ is decreased).

At the beginning of the waveform (prior to point 70), buck converter 20 is operating normally as indicated by line 60.

During this time, the monitored peak current $I_{PK}$ does not exceed the blocking current threshold $I_{block}$ and therefore does not require an extension of the 'off' time. At point 70, the monitored current exceeds the cycle-by-cycle threshold $I_{CBC}$. In response, high-side switch $Q_3$ is turned 'off', but because the monitored peak current $I_{PK}$ does not exceed the blocking current threshold $I_{block}$ no extension of the 'off' time is required.

At point 72, the monitored current once again exceeds the cycle-by-cycle threshold $I_{CBC}$, resulting in high-side switch $Q_3$ being turned 'off'. However, in this cycle the monitored peak current $I_{PK}$ exceeds the blocking current threshold $I_{block}$ at point 74. In response, the 'off' time is extended for a duration indicated by line 64.

At point 76, the extended 'off' time ends and high-side transistor $Q_3$ is turned 'on'. The monitored start current $I_{start}$ is measured, and because it is less than the minimum current threshold $I_{min}$ (and because peak current $I_{PK}$ exceeded the blocking current threshold Iblock in the previous cycle) the value of the multiplier $k_{block}$ is decremented or decreased as indicated by the hash mark on line 66.

At point 78, the monitored current once again exceeds the cycle-by-cycle threshold, resulting in high-side switch $Q_3$ being turned 'off'. Because the monitored peak current $I_{PK}$ exceeds the blocking current threshold $I_{block}$, the 'off' time is extended for a duration indicated by line 64. However, because the $k_{block}$ multiplier was decreased at point 76, the duration of the extended 'off' time in this cycle is less than the duration of the extended 'off' cycle following point 74.

At point 82, the extended 'off' time ends and high-side transistor $Q_3$ is turned 'on'. The monitored start current is measured, and because it is less than the minimum current threshold $I_{MIN}$, the $k_{block}$ multiplier is decreased once again as indicated by the hash mark on line 66.

At point 84, the monitored current once again exceeds the cycle-by-cycle threshold, resulting in high-side switch $Q_3$ being turned 'off'. Because the monitored peak current $I_{PK}$ exceeds the blocking current threshold $I_{block}$, the 'off' time is extended for a duration indicated by line 64. Because the $k_{block}$ multiplier was decreased at point 82, the duration of the extended 'off' time in this cycle is less than the duration of the extended 'off' cycle following point 80.

At point 88, the extended 'off' time ends and high-side transistor $Q_3$ is turned 'on'. The monitored start current is measured, and because it is greater than the minimum current threshold $I_{MIN}$, the $k_{block}$ multiplier is left unchanged. As a result, despite the monitored current exceeding the blocking current threshold $I_{block}$ subsequent to point 88, the duration of the extended 'off' time does not result in the starting current falling below the minimum current threshold $I_{min}$. As a result, the average current value is maintained at a desirable value while preventing ratcheting of the monitored current.

Figure 5B:
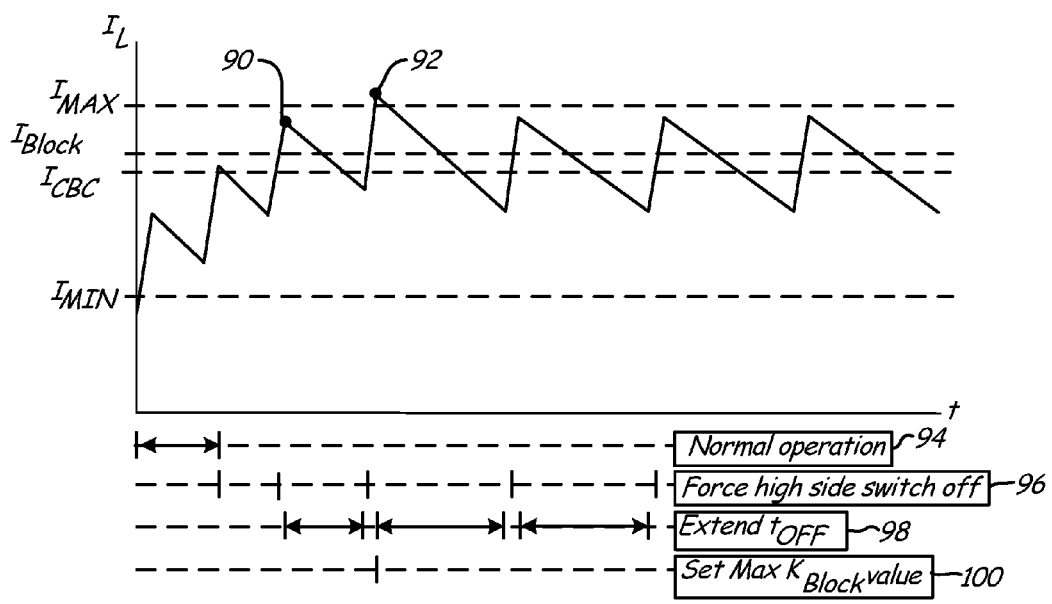

FIG. 5B is timing diagram that illustrates the functions performed by over-current protection device 26 as described with respect to the embodiment shown in FIG. 4. In particular, FIG. 5B illustrates how the value of multiplier $k_{block}$ is increased in response to the monitored current exceeding the maximum current threshold $I_{MAX}$.

Threshold values illustrated in FIG. 5B include the maximum current threshold $I_{max}$, the blocking current threshold $I_{block}$, the cycle-by-cycle threshold $I_{CBC}$, and the minimum current threshold $I_{min}$. Along the bottom of the graph are timelines indicating the state of various signals during the operation of buck converter 20 according to an embodiment of the present invention. Top line 94 is labeled 'Normal Operation' and indicates with an unbroken line those time periods in which no extension of the 'off' time is required and the operation of transistor $Q_3$ is determined by switching signal $V_{SW}$. Line 96 is labeled 'Force high-side switch off' and indicates with hash marks those instances in which the monitored current $I_L$ exceeds the cycle-by-cycle threshold $I_{CBC}$ such that the high-side switch $Q_3$ should be turned 'off'. Line 98 is labeled 'Extend $t_{off}$' and indicates with unbroken lines those time periods in which the 'off' time of high-side switch $Q_3$ is extended in response to the peak current $I_{PK}$ crossing the blocking threshold $I_{block}$. Line 100 is labeled 'Set Max $k_{block}$ value' and indicates with hash marks those instances in which the monitored current exceeds the maximum current threshold $I_{max}$ such that the duration of the 'off' time should be increased (in this example, the magnitude of the multiplier value $k_{block}$ is increased to a maximum value).

At point 90, the monitored current exceeds the blocking current threshold $I_{block}$ such that the 'off' time of the high-side switch $Q_3$ is extended as indicated by the unbroken portion of line 98. In the next cycle, at point 92 the monitored peak current value exceeds not only the blocking current threshold $I_{block}$, but also the maximum current threshold $I_{MAX}$ because the previous off time was too short. In response, the value of multiplier $k_{block}$ is increased to the maximum value in order to increase the duration of the 'off' time. In this way, the value of multiplier $k_{block}$ may be increased in response to an 'off' time that is too short in duration.

This technique of modifying the function that determines off time to keep the current between $I_{MIN}$ and $I_{MAX}$ not only applies to modulating $t_{off}$ based on $I_{PK}$ but also to other techniques such as reducing the switching frequency proportional to the output voltage (shown in more detail with respect to FIGS. 8, 9A, and 9B below). To provide a sufficient off time during a short circuit event the switching frequency is often reduced at low output voltages such that $t_{on\_min}$ provides the required duty-cycle to prevent the current from ratcheting up. For this application the proposed invention can be used to modify the relationship between the switching frequency and the output voltage.

Figure 6:
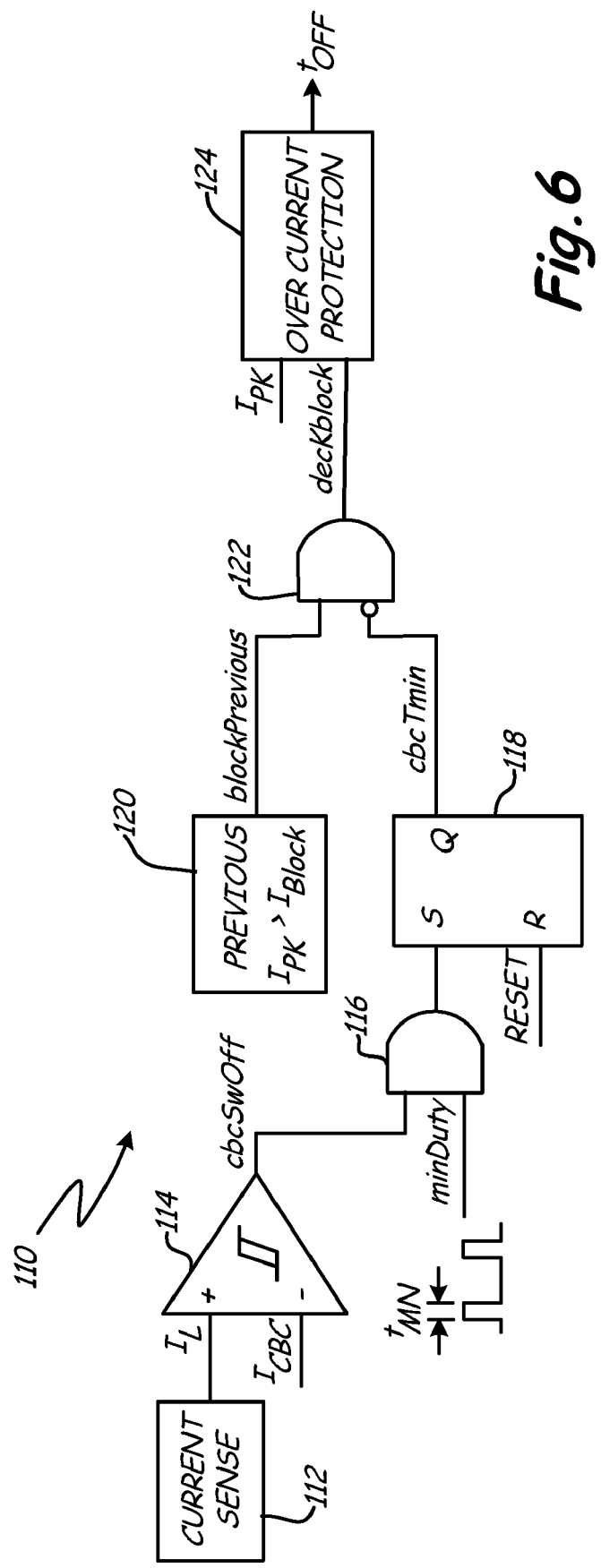
FIG. 6 is a block diagram of logic circuits employed to determine whether the monitored current falls below the minimum current threshold $I_{min}$ according to an embodiment of the present invention.

FIG. 6 is a block diagram of logic circuits employed to determine whether the monitored current falls below the minimum current threshold $I_{min}$. The block diagram includes current sense circuit 112, comparator 114, AND gate 116, SR latch 118, previous $I_{PK}>I_{Block}$ block 120, AND gate 122, and over-current protection device 124. Rather than measure the current at the start of each cycle to determine the value of $I_{start}$, this embodiment seeks to monitor the peak-to-peak current—defined as the difference between the monitored peak current $I_{PK}$ and the starting current $I_{start}$—in the time domain (i.e., based on measurements of time rather than on current measurements). The input voltage Vin, the output voltage Vout, and the inductance of inductor L2 sets the slope of the line representing the current, which will remain fairly consistent between cycles. Based on a fairly consistent slope, the starting current $I_{start}$ can be estimated based on knowledge of the magnitude of the current and the time at which the current is monitored.

In the embodiment described in FIG. 6, the measured starting current $I_{start}$ is determined based on the time associated with when the monitored current exceeds the cycle-by-cycle threshold $I_{CBC}$ (e.g., determined by sampling a time value in response to the monitored current exceeding the cycle-by-cycle threshold). If the monitored current does not exceed the cycle-by-cycle threshold $I_{CBC}$ during a minimum time period—assuming in the previous cycle that the peak current $I_{PK}$ exceeded the blocking current threshold $I_{block}$—then it can be inferred $I_{start}$ has dropped below the minimum threshold $I_{min}$ such that the value of the multiplier $k_{block}$ should be decreased. The block diagram in FIG. 6 illustrates an exemplary embodiment for performing this function (although in other embodiments other mechanisms or thresholds may be employed).

The inductor current $I_L$ is monitored by current sense 112. As discussed above, the current $I_L$ may be monitored through inductor $L_2$ (as shown in FIG. 3) directly, or may be a result of monitoring the current through high-side transistor $Q_3$ (as shown in FIG. 3). The monitored current $I_L$ is compared with the cycle-by-cycle threshold $I_{CBC}$ by comparator 114. In response to the monitored current $I_L$ exceeding the cycle-by-cycle threshold $I_{CBC}$, comparator 114 generates the signal 'cbcSwOff'. In this embodiment, the signal cbcSwOff is 'high' when the monitored current $I_L$ is greater than the cycle-by-cycle threshold $I_{CBC}$. Once the high-side switch $Q_3$ is turned 'off', the monitored current (if measured through high-side switch $Q_3$) goes to zero, and thus the signal 'cbcSwOff' also goes 'low'.

The signal 'minDuty' represents the minimum 'on' time for the high-side switch $Q_3$, which goes high when Q3 turns on and goes low after a fixed time period $t_{min}$. Generally the minimum 'on' time is fixed across all cycles and is similar to the $t_{on\_min}$ discussed in relation to FIG. 2B. The signals 'cbcSwOff' and 'minDuty' are provided as inputs to AND gate 116. The output of AND gate 116 is 'high' in response to both input signals being 'high'. This represents a situation in which the monitored current $I_L$ crosses the cycle-by-cycle threshold $I_{CBC}$ during the minimum 'on' time $t_{min}$ of the high-side switch $Q_3$ (as represented by the signal 'minDuty'), indicating that the starting current $I_{start}$ is not less than the minimum current threshold $I_{min}$. The output of AND gate 116 is 'low' if the minimum 'on' time $t_{min}$ ends before the monitored current exceeds the cycle-by-cycle threshold as defined by the signal 'cbcSwOff', indicating that the start current $I_{start}$ is less than the minimum threshold $I_{min}$.

The output of AND gate 116 is provided as input to SR latch 118. In response to the signal from AND gate 116, SR latch provides the same signal at its output (i.e., latches the input provided by AND gate 116). At the beginning of each cycle the 'Reset' signal connected to SR latch 118 clears the previous result, and the signal 'cbcTmin' is set to 'low' until a high signal is received from AND gate 116. The output of SR latch is provided as an input to AND gate 122 along with the output provided by block 120 indicating whether the monitored current associated with the previous cycle was greater than the blocking current threshold $I_{block}$. The circle at the input of AND gate 122 represents that the value of the input is reversed, such that when the signal 'cbcTmin' is 'low' the resulting signal compared with the signal 'blockPrevious' is 'high'. The output of AND gate 122 is provided to over-current protection device 124, and determines whether the multiplier $k_{block}$ should be decremented. In response to the previous cycle having a peak current $I_{PK}$ greater than the current threshold $I_{block}$ and the signal 'cbcTmin' being 'low', indicating that monitored current did not exceed the cycle-by-cycle threshold during the minimum 'on' time $t_{min}$, the multiplier $k_{block}$ is decremented. As previously described, the over-current protection circuit 124 calculates the duration of the extended off time $t_{OFF}$ based on the value of the monitored peak current $I_{PK}$ and the value of the multiplier $k_{block}$.

Figure 7:
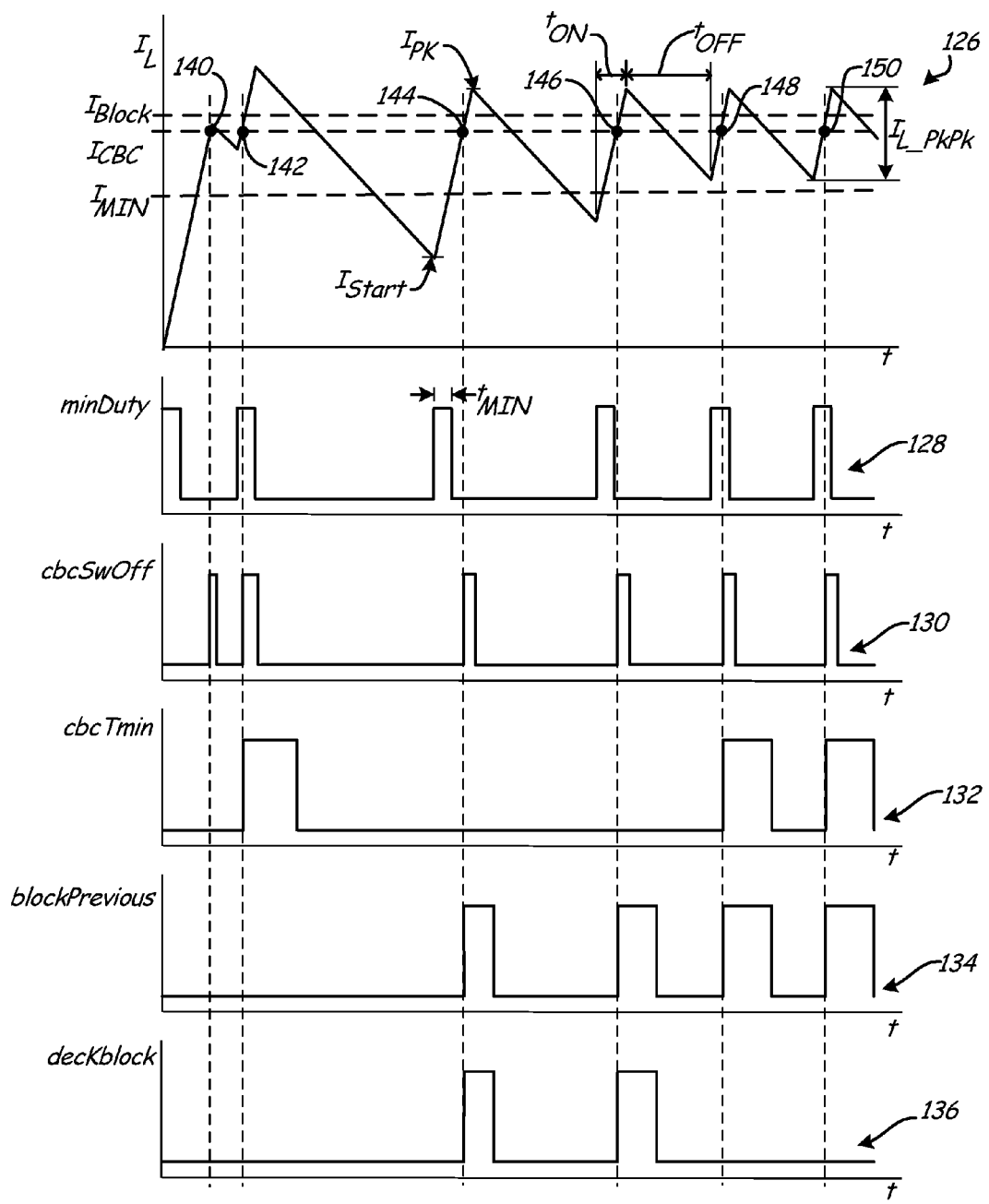
FIG. 7 includes a plurality of timing diagrams illustrating the operation of the logic circuits described with respect to FIG. 6 according to an embodiment of the present invention.

FIG. 7 includes a plurality of timing diagrams illustrating the operation of the logic circuits described with respect to FIG. 6 according to an embodiment of the present invention. Timing diagram 126 illustrates the inductor current $I_L$ through multiple cycles. Timing diagram 128 illustrates the minimum duty cycle signal 'minDuty'. Timing diagram 130 illustrates the signal 'cbcSwOff' generated by comparator 114 in response to the monitored current $I_L$ exceeding the cycle-by-cycle threshold $I_{CBC}$. Timing diagram 132 illustrates the signal 'cbcTmin' generated by SR latch 118 in response to the signals 'minDuty' and 'cbcSwOff'. Timing diagram 134 illustrates the signal 'blockPrevious' generated by Previous $I_{PK}$ block 120 in response to the monitored peak current $I_{PK}$ exceeding the blocking current threshold $I_{block}$, and timing diagram 136 illustrates the signal 'decKblock' generated by AND gate 122 in response to the signals 'cbcTmin' and 'blockPrevious'.

As shown with respect to diagram 126, during the first on/off cycle the monitored current $I_L$ exceeds the cycle-by-cycle threshold $I_{CBC}$ at point 140. As a result, the signal 'cbcSwOff' provided by comparator 114 is a logical 'high' value. In this case, the minimum 'on' time $t_{min}$ that started when $Q_3$ turned on as defined by the signal 'minDuty' has already expired (i.e., logical 'low' value) such that signal 'cbcTmin' is a logical 'low' value indicating that the starting current at the beginning of the cycle was less than the minimum current threshold $I_{min}$. However, the monitored current $I_L$ did not exceed the blocking current threshold $I_{block}$ in the previous cycle, so the output of AND gate 122 indicates that the multiplier $k_{block}$ should not be decremented.

In the next cycle, the monitored current $I_L$ exceeds the cycle-by-cycle threshold $I_{CBC}$ during the minimum 'on' time $t_{min}$ at point 142, indicating that the current did not decrease below the minimum threshold $I_{min}$. As a result, the output of AND gate 116 is a logical 'high' value. This value is latched by SR latch 118, resulting in the output 'cbcTmin' being a logical 'high' value. As a result, the multiplier $k_{block}$ is not decremented. In addition, the monitored current $I_L$ did not exceed the blocking current threshold $I_{block}$ in the previous cycle, so the other input to AND gate 122 is a logical 'low' value.

In the next cycle, the monitored current $I_L$ exceeds the cycle-by-cycle threshold $I_{CBC}$ at point 144 following the expiration of the minimum 'on' time $t_{min}$, indicating that the starting current was less than the minimum threshold $I_{min}$. This in turn indicates, that if the 'off' time was extended in response to the peak current $I_{PK}$ exceeding the blocking current threshold $I_{block}$, that the duration of the 'off' time was too long and should be reduced by decrementing the magnitude of multiplier $k_{block}$. In this example, the peak current $I_{PK}$ did exceed the blocking current threshold in the previous cycle as indicated by the value of the signal 'blockPrevious'. As a result, AND gate 122 generates a logical 'high' output that indicates to over-current protection device 124 that the value of the multiplier $k_{block}$ should be decremented or decreased.

Likewise, in the next cycle the monitored current $I_L$ exceeds the cycle-by-cycle threshold $I_{CBC}$ at point 146 following the expiration of the minimum 'on' time $t_{min}$, indicating that the starting current was less than the minimum threshold $I_{min}$. Once again, the peak current $I_{PK}$ did exceed the blocking current threshold in the previous cycle as indicated by the value of the signal 'blockPrevious'. As a result, AND gate 122 generates a logical 'high' output that indicates to over-current protection device 124 that the value of the multiplier $k_{block}$ should be decremented or decreased.

In the next cycle, the duration of the 'off' time being twice reduced, the monitored current $I_L$ exceeds the cycle-by-cycle threshold at point 148 during the minimum 'on' time $t_{min}$, indicating that the starting current was greater than the minimum threshold $I_{min}$. Despite the fact that the monitored peak current $I_{PK}$ exceeded the blocking current threshold in the previous cycle, the value of the multiplier $k_{block}$ is not decremented. The same holds true for the following cycle, in which the monitored current $I_L$ exceeds the cycle-by-cycle threshold during the minimum 'on' time $t_{min}$. As a result, diagram 126 illustrates with respect to the last cycle the peak-to-peak current $I_{L\_PkPk}$ being relatively small compared with the peak-to-peak currents occurring during earlier cycles, resulting in an acceptable average current.

This method of using the minimum 'on' time $t_{min}$ to detect that excessive peak-to-peak currents have resulted due to an excessive $t_{off}$ extension can also be applied to the technique of reducing the switching frequency proportional to the output voltage. If the switching frequency is excessively reduced an over current event will result in an 'on' time that is longer than $t_{min}$ which will result in high peak-to-peak currents and low average currents. The above technique can be used to detect this event and adjust the function that determines the relationship between the switching frequency and the output voltage.

Figure 8:
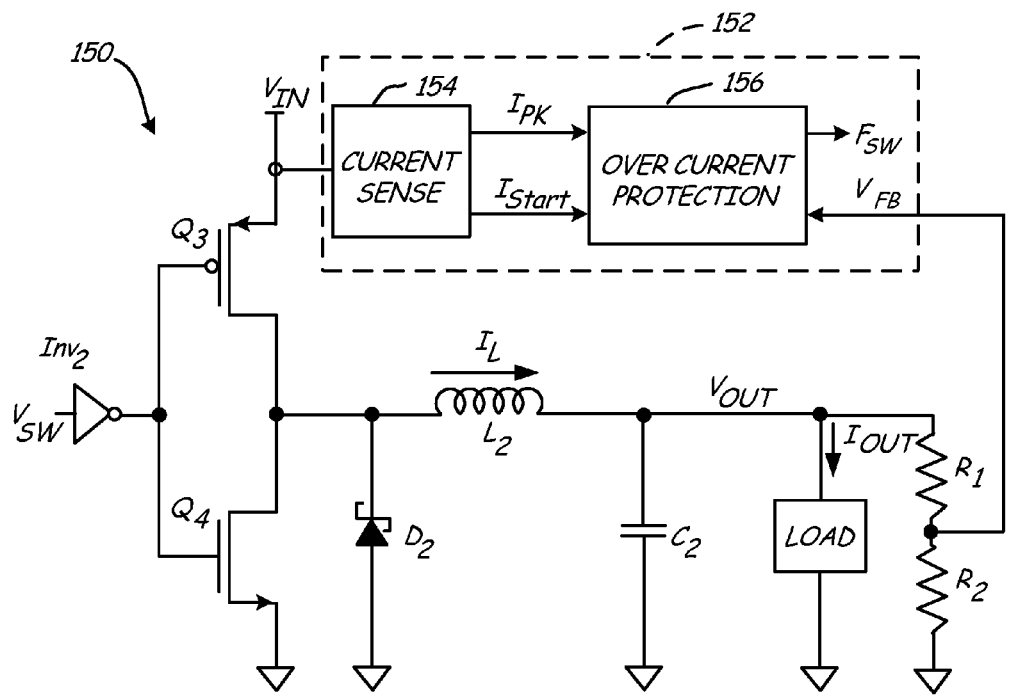
FIG. 8 is a circuit/block diagram of an over-current protection device connected to monitor output a buck converter according to an embodiment of the present invention.

FIG. 8 is a circuit/block diagram of switched mode power supply 150 according to an embodiment of the present invention. Similar to the embodiment shown in FIG. 3, SMPS 150 is a buck converter that includes protection device 152, which in turn includes current sense device 154 and over-current protection device 156. Once again, a buck converter is one example of a switched-mode power supply which is suitable for use with protection device 152. In other embodiments, protection device 152 may be used in conjunction with other configurations of switched-mode power supplies or converters. For example, in other SMPS topologies the inductor employed by the buck converter may be replaced with a transformer.

The embodiment shown in FIG. 8 differs from the embodiment shown in FIG. 3 in that over-current protection device 156 provides overcurrent protection by modifying the function employed to determine the switching frequency of the SMPS based on the monitored output voltage $V_{FB}$. For switched-mode power supplies in which the switching frequency is varied in response to the monitored output voltage, the monitored peak-to-peak current is employed to modify the relationship between the switching frequency and the monitored output voltage.

Figure 9A:
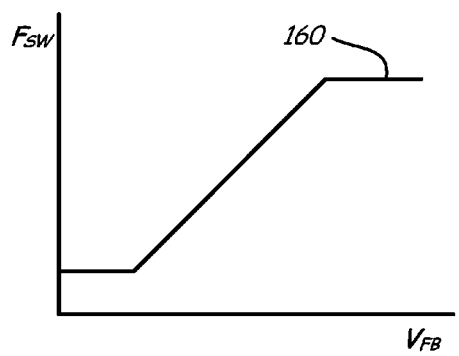
FIGS. 9A and 9B are diagrams illustrating graphically the functions employed to determine the switching frequency according to embodiments of the present invention.
Figure 9B:
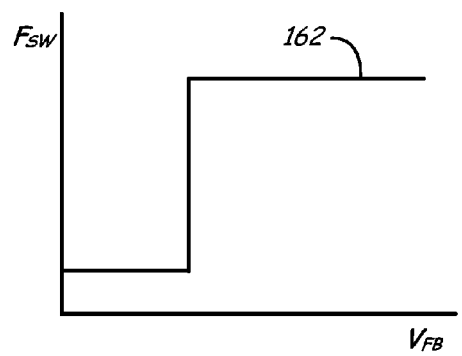

FIGS. 9A and 9B provide two examples of how the monitored peak-to-peak current may be employed to modify the relationship between switching frequency and monitored output voltage. In FIG. 9A, the switching frequency is linearly related to the monitored output voltage. As the monitored output voltage increases, the switching frequency proportionally increases. This relationship can be modified (i.e., the slope of the line dictating the relationship between the switching frequency and the monitored output voltage) based on the monitored peak-to-peak current. For example, if the monitored peak-to-peak current exceeds a desired threshold, the slope of the function relating the switching frequency $F_{SW}$ to the monitored output voltage $V_{FB}$ is increased. The increased slope increases the switching frequency, while the minimum on time defines the duty cycle of the switching frequency, resulting in the off time being reduced to reduce the peak-to-peak current. Likewise, the slope of the function may be decreased as necessary to prevent excessive peak currents.

In FIG. 9B, the switching frequency is defined as either 'high' or 'low' depending on the monitored output voltage $V_{FB}$. In this embodiment, rather than modifying the slope of the function relating the switching frequency $F_{SW}$ to the monitored output voltage $V_{FB}$, the function modifies the digital threshold that determines whether the switching frequency is 'high' or 'low'. For example, if the monitored peak-to-peak current exceeds a desired threshold, the digital threshold may be decreased such that the switching frequency is increased at a lower monitored output voltage. The increased switching frequency (at lower monitored output voltage) decreases the peak-to-peak current monitored by protection device 152.

In this way, the present invention is applied to applications that modify the switching frequency based on the monitored output voltage. However, rather than modify the function relating the off time to the monitored peak currents, the embodiment shown in FIG. 8 modifies the function relating the switching frequency to the monitored output voltage. In both applications, current ratcheting is prevented while maintaining the peak-to-peak current in a desired range such that the average current is maintained at a desired level.

While the invention has been described with reference to an exemplary embodiment(s), it will be understood by those skilled in the art that various changes may be made and equivalents may be substituted for elements thereof without departing from the scope of the invention. For example, although described with respect to a buck converter in which the high-side switch is controlled to regulate the output of the buck converter, the present invention is applicable to other well-known converter topologies. In addition, overcurrent protection device could be implemented with analog or digital control techniques (e.g., the digital circuit described with respect to FIG. 6 could be implemented with analog circuitry, or by hardware running software capable of performing the functions described). In addition, many modifications may be made to adapt a particular situation or material to the teachings of the invention without departing from the essential scope thereof.

In particular, the present invention is directed towards means of selectively turning 'on' and 'off' the switch associated with the SMPS to prevent over-current conditions. As described above, this may include selectively extending the duration of 'off' times associated with the switch, or selectively altering the switching frequency of the switch. These over current protection techniques can be applied to a wide variety of regulation schemes. One such technique described above, is to operate with a fixed frequency and modify the duty cycle to regulate the output. Another technique is to operate with a fixed 'on' time and modify the 'off' time to regulate the output. Similarly, another technique is to operate with a fixed 'off' time and modify the 'on' time to achieve regulation. Triggering of over-current protection (i.e., when over-current protection takes precedence over output regulation) may be based on a monitored output such as current and/or voltage. In one embodiment, over-current protection is triggered when the inductor current exceeds a threshold value. In another embodiment, over-current protection is triggered when the output current exceeds a threshold value. In yet another embodiment, over-current protection is triggered when the output voltage drops below a threshold value.

Therefore, it is intended that the invention not be limited to the particular embodiment(s) disclosed, but that the invention will include all embodiments falling within the scope of the appended claims.

The invention claimed is:

1. A switched mode power supply (SMPS) comprising:
   at least one passive element for storing energy in the SMPS;
   at least one switch selectively switched between an 'on' state and an 'off' state, wherein in the 'on' state the at least one switch causes energy stored in the at least one passive elements to increase with time and in the 'off' state causes the energy stored in the at least one passive element to decrease with time;
   an over-current protection device that monitors current associated with the SMPS and selectively modifies the switching of the at least one switch according to a function related to at least one of the monitored current and a voltage associated with the SMPS, wherein the overcurrent protection device modifies the function to maintain the monitored current between a maximum threshold value and a minimum threshold value.

2. The SMPS of claim 1, wherein the over-current protection device extends an 'off' time of the at least one switch according to a function relating the monitored current to a duration of the 'off' time.

3. The SMPS of claim 2, wherein the function is defined by the following equation: $t_{off} \propto k_{block} * (I_{PK} - I_{block})$, wherein duration of the 'off' time $t_{off}$ is defined by the monitored peak current $I_{PK}$ exceeding a threshold value $I_{block}$ and a multiplier value that is selectively modified to ensure the monitored current does not exceed a maximum threshold value and does not fall below a minimum threshold value.

4. The SMPS of claim 1, wherein the over-current protection device modifies a switching frequency associated with the at least one switch according to a function relating the switching frequency to the voltage associated with the SMPS.

5. The SMPS of claim 4, wherein the function relating the switching frequency to the voltage associated with the SMPS is defined to decrease the switching frequency proportional to the voltage, wherein the proportionality of the function is modified to ensure the monitored current does not exceed the maximum threshold value and does not fall below the minimum threshold value.

6. The SMPS of claim 4, wherein the function relating the switching frequency to the voltage associated with the SMPS is binary, wherein a voltage threshold value determines whether the switching frequency is 'high' or 'low', wherein the voltage threshold value is modified to ensure the monitored current does not exceed the maximum threshold value and does not fall below the minimum threshold value.

7. The SMPS of claim 1, wherein the over-current protection device further includes:
a time domain peak-to-peak current measurement device that determines whether the monitored current has fallen below the minimum threshold value based on a time sampled in response to the measured magnitude crossing a threshold value.

8. The SMPS of claim 7, wherein the time domain peak-to-peak current measurement device compares the monitored current to a cycle-by-cycle threshold value and determines whether the current has fallen below the minimum threshold value based on whether the monitored current exceeds the cycle-by-cycle threshold within a minimum 'on' time associated with the at least one switch.

9. A method of protecting a switched-mode power supply (SMPS), having at least one switch selectively switched between an 'on' state and an 'off' state to regulate an output of the SMPS, from over-current faults, the method comprising:
monitoring a current associated with the SMPS;
selectively controlling the at least one switch according to an over-current protection function that is based on at least one of the monitored current and a voltage associated with the SMPS; and
selectively modifying the function to maintain the monitored current between a maximum threshold value and a minimum threshold value.

10. The method of claim 9, wherein selectively controlling the at least one switch includes extending a duration of the 'off' state in response to the monitored current exceeding a threshold value, wherein the function relates the duration of the 'off' time to the monitored current.

11. The method of claim 10, wherein the function relating the duration of the 'off' time to the monitored current is defined by the following equation: $t_{off} \propto k_{block} * (I_{PK} - I_{block})$, wherein the duration of the 'off' time $t_{off}$ is defined by the monitored current $I_{PK}$ exceeding a threshold value $I_{block}$ and a multiplier value $k_{block}$ that is selectively modified to ensure the monitored current does not exceed a maximum threshold value and does not fall below a minimum threshold value.

12. The method of claim 11, wherein selectively modifying the function includes decreasing the multiplier value $k_{block}$ in response to the monitored current falling below a minimum threshold value following an 'off' time extension.

13. The method of claim 11, wherein selectively modifying the function includes increasing the multiplier value $k_{block}$ in response to the monitored current exceeding a maximum threshold.

14. The method of claim 9, wherein selectively controlling the at least one switch includes modifying a switching frequency of the at least one switch, wherein the function relates the switching frequency to the voltage associated with the SMPS.

15. The method of claim 14, wherein the function relating the switching frequency to the voltage of the SMPS decreases the switching frequency proportional to the voltage, wherein selectively modifying the function includes modifying the proportionality of the switching frequency to the voltage to maintain the monitored current between the maximum threshold value and the minimum threshold value.

16. The method of claim 14, wherein the function relating the switching frequency to the voltage is binary, wherein a voltage threshold value determines whether the switching frequency is 'high' or 'low', wherein selectively modifying the function includes modifying the voltage threshold to maintain the monitored current between the maximum threshold value and the minimum threshold value.

17. The method of claim 9, wherein selectively modifying the function includes:
detecting a peak-to-peak current magnitude in the time domain based on a time sampled in response to the monitored current crossing a specific current magnitude.

18. The method of claim 17, wherein detecting the peak-to-peak current magnitude includes:
detecting when the monitored current exceeds a cycle-by-cycle threshold;
determining in the time domain the magnitude of the peak-to-peak current magnitude based on whether the monitored current exceeds the cycle-by-cycle threshold within a minimum duty cycle; and
modifying the over current protection function if the monitored current exceeds the cycle-by-cycle threshold subsequent to the minimum duty cycle.

19. A protection device for use with a switched mode power supply (SMPS), the over-current protection device comprising:
a current sense device connected to monitor current through the SMPS and to detect a peak current value and a starting current value associated with the monitored current; and
an over-current protection device connected to receive the detected peak current value and the detected starting current value from the current sense device, wherein the over-current protection device generates an 'off' signal that extends an 'off' time of the SMPS in response to the detected peak current value exceeding a threshold value, wherein a duration of the 'off' signal is based on a function relating the duration of the 'off' signal to the magnitude of the detected peak current value, wherein the function is modified based on the starting current value and the peak current value to maintain the current between a maximum threshold value and a minimum threshold value.

20. The protection device of claim 19, wherein the function relating the duration of the 'off' signal to the magnitude of the detected peak current value includes a variable multiplier that is selectively increased and decreased in response to the monitored peak current value and the monitored starting current value, wherein increasing the variable multiplier increases the duration of the 'off' signal and decreasing the variable multiplier decreases the duration of the 'off' signal.

21. The protection device of claim 20, wherein the variable multiplier value is increased in response to the monitored peak current exceeding a maximum threshold value.

22. The protection device of claim 20, wherein the variable multiplier value is decreased in response to the monitored starting current falling below a minimum threshold value following an extended 'off' time.

23. The protection device of claim 20, wherein the over-current protection device detects the starting current in the time domain based on a sampled time at a known magnitude of the monitored current.

24. A protection device for use with a switched mode power supply (SMPS), the over-current protection device comprising:
   a current sense device connected to monitor current through the SMPS;
   a voltage sense device connected to monitor output voltage of the SMPS;
   an over-current protection device connected to receive the monitored current from the current sense device and the monitored output voltage from the voltage sense device, wherein the over-current protection device modifies a switching frequency of the SMPS in response to the monitored output voltage, wherein the switching frequency is selected based on a function relating the switching frequency to the monitored output voltage, wherein the function is modified based on the monitored current through the SMPS to maintain the current between a maximum threshold value and a minimum threshold value.

25. The protection device of claim 24, wherein the function relating the switching frequency to the monitored output voltage decreases the switching frequency proportional to the monitored output voltage, wherein the protection device modifies the proportionality between the switching frequency and the monitored output voltage to maintain the monitored current between the maximum threshold value and the minimum threshold value.

26. The protection device of claim 24, wherein the function relating the switching frequency to the monitored output voltage is binary, wherein a voltage threshold value determines whether the switching frequency is 'high' or 'low', wherein the protection device modifies the voltage threshold value to maintain the monitored current between the maximum threshold value and the minimum threshold value.

* * * * *